Patented Dec. 4, 1951

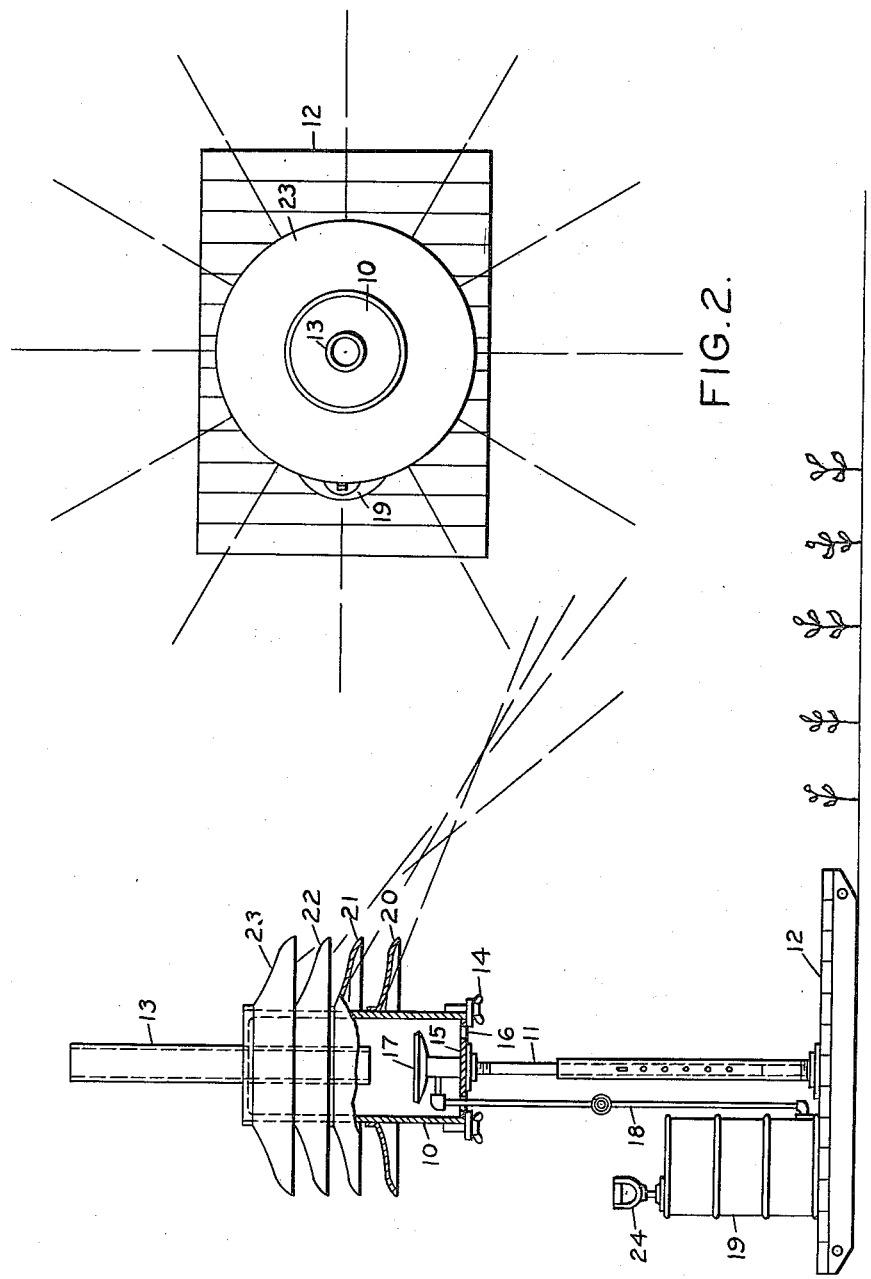
Arthur W. Farrall  INVENTOR.

2,577,410

UNITED STATES PATENT OFFICE 2,577,410

RADIANT HEATER HAVING PLURAL REFLECTORS FOR PREVENTING FROST DAMAGE TO PLANT LIFE

Arthur W. Farrall, East Lansing, Mich., assignor, by mesne assignments, to Research Corporation, New York, N. Y., a corporation of New York Application December 11, 1946, Serial No. 715,512

3 Claims. (Cl. 126—59.5)

This invention relates to the prevention of frost damage to plant life, particularly to prevention of frost by means of heat.

Statistics show that in most of the United States the growing season for crops can be lengthened by as much as two months by eliminating the possibility of frost damage during three or four nights in the late spring and a like number of nights in the early autumn. As a rule frost occurs on cool, clear nights when the air is still. The temperatures occurring on such nights usually are not much below freezing. Under these conditions heat from the earth and plants is radiated into outer space so rapidly that the surface of the earth and the plants are cooled below 32 degrees and frost forms.

Various methods of preventing frost formation on crops have been tried, but all of the previous methods have been relatively impractical or excessively expensive, and none has furnished complete protection. Attempts have been made to heat the air by means of smudge pots, but this method is exceedingly expensive because of the very large amounts of heat required, particularly if there is any movement of the air at all. In another method of frost prevention the air is kept rapidly circulating so as to bring down from the space above the earth the warmer air which tends to stratify there. In still another method the plants are continuously sprayed with water, which upon freezing gives up its heat of crystallization and thereby maintains the surface of the plants upon which the spray falls at a temperature of thirty-two degrees.

The principal object of the present invention is to provide an apparatus by means of which damage to crops can be eliminated during periods of heavy frost, without excessive cost.

This object is attained by heating the plants, and to some extent the surface of the ground within the area to be treated, by means of radiant heat from a suitable source. Heat is distributed substantially uniformly over the area to be heated, yet largely confined to that area by means of reflectors associated with the heater. The heat is produced and distributed at a rate at least as great as the radiation loss from the plants and the ground within the area treated. Thus, there is very little loss of heat energy in heating the air surrounding the plants. Furthermore, only the upper surfaces of the topmost leaves of the plants need to be heated, because those leaves protect the lower leaves of the plants by reducing radiation from the latter.

In the drawings:

Figure 1 is an elevational view of a radiant heater embodying one form of the invention; and Figure 2 is a plan view of the same.

The heater disclosed in the drawings comprises a heat chamber 10 supported by means of an adjustable standard 11 on a base 12.

The heat chamber 10 is in the form of a combustion chamber having a stack 13 attached to its upper end. The side wall of the heat chamber is removably secured by suitable means, such as bolts and wing nuts 14 to a bottom plate 15. The bottom plate has a plurality of air inlet openings 16 to provide air for combustion. The bottom plate supports a burner 17 which may be an oil burner of conventional form or a gas burner for bottled liquid petroleum gas. The burner is connected by a conduit 18, which may be a flexible hose, to a fuel reservoir 19 mounted on the base 12. A pump 24 is provided for forcing fuel up into the burner.

A plurality of annular reflectors 20, 21, 22 and 23 surround the heat chamber and are attached at their radially inner edges to the side wall of the heat chamber. The lower surfaces of the reflectors are highly polished so as to reflect the radiant heat from the sides of the heat chamber with very little loss.

For most efficient results in heating a predetermined area, it is important that a large proportion of the heat be radiated outwardly toward the edges of the plot being treated. To this end the reflectors are given a cross-sectional curvature generally indicated in Figure 1. Thus, the radially outer portion of each reflector is less sharply inclined to the horizontal than the radially inner portion. Also, the overall inclination of the uppermost reflector in reference to the horizontal is greater than that of the lowermost, and the intermediate reflectors are inclined to an extent between the upper and lower reflectors. The exact curvature and inclinations vary with different sizes of heaters for different sized plots. The best inclination can be readily determined for any particular area to be covered.

The sizes of the burner and heat chamber will, of course, vary with the area to be heated. It has been determined that to heat a plot of 1 acre, a heater having an output of 1,000,000 B. t. u. per hour will give satisfactory results, both from the standpoint of frost prevention and economy of operation. Larger or smaller areas can be heated with proportionately larger or smaller installations. It will be realized, however, that from the standpoint of economy there is a limit on the size of the heaters, both as to maximum and minimum capacity. As the size of the heaters is increased their heating efficiency near the edges of the plot to be treated decreases somewhat, while a decrease in size increases the number of heaters required, and consequently the initial cost, where a relatively large area is to be covered. Where a number of heaters are employed, their effective areas would overlap and the heating effect within the entire area covered will be quite uniform. For small plots of less than an acre, a single smaller heater would be most efficient.

Actual tests of the method of the present invention indicate that substantially all of the heat radiated by the heater is absorbed by the plants and the ground, and not by the air. Thus, during a night when the air temperature reached 33.5°, the grass temperature was 31° and the ground temperature 1 inch deep was 42.5°. With radiant heat supplied the grass temperature was raised to 37°, an increase of 6°, while the ground temperature was raised to 43.6° and the air temperature to 34°, increases of 1.1° and .5° respectively. No frost damage occurred in the plot treated, while outside of the plot a heavy frost occurred.

Thus, it will be seen that the present invention provides a very economical and efficient apparatus for preventing frost damage to plants.

While the heater shown is intended to prevent frost damage to plants, it will be evident that it can be used for numerous other purposes. For instance, freshly laid concrete can be kept from freezing during cold weather. Other uses of the heater will be apparent to those skilled in the art.

The scope of the invention is indicated in the appended claims.

What is claimed is:

1. Combustion apparatus for heating by means of infrared rays an unenclosed area many times the horizontal extent of said combustion apparatus comprising a heat exchanger having a tubular side wall and a plurality of relatively wide annular reflector plates attached to said heat chamber in vertically spaced relation and substantially transverse to the axis thereof, the reflector plates being arranged at such a relative angle to said side wall that substantially all rays normal thereto strike said plates and are reflected and directed outwardly beyond the outer confines of any area beneath said plates.

2. Combustion apparatus as defined in claim 1 wherein the inclination of the reflectors adjacent the upper part of said side wall are such as to reflect rays emanating from said side wall a different horizontal distance than those of the reflector plates adjacent the lower part of said side wall.

3. Combustion apparatus as defined in claim 1 wherein the inclination relative to the horizontal of the reflector plates adjacent the upper portion of the side wall is greater than the inclination of the reflector plates adjacent the lower part of said side wall.

ARTHUR W. FARRALL.

REFERENCES CITED

The following references are of record in the file of this patent:

UNITED STATES PATENTS

| Number | Name | Date |
|---|---|---|
| 1,680,005 | Bevier | Aug. 7, 1928 |
| 2,067,416 | Rolph | Jan. 12, 1937 |
| 2,210,419 | Lambert | Aug. 6, 1940 |
| 2,315,764 | Bashore | Apr. 6, 1943 |

FOREIGN PATENTS

| Number | Country | Date |
|---|---|---|
| 115,481 | Australia | July 1, 1942 |